US012637775B2

(12) United States Patent  
Batarseh

(10) Patent No.: US 12,637,775 B2  
(45) Date of Patent: May 26, 2026

(54) HYBRID DESCALING SYSTEM WITH ACID INJECTION

(71) Applicant: SAUDI ARABIAN OIL COMPANY, Dhahran (SA)

(72) Inventor: Sameeh Issa Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 37 days.

(21) Appl. No.: 18/616,334

(22) Filed: Mar. 26, 2024

(65) Prior Publication Data

US 2025/0305153 A1 Oct. 2, 2025

(51) Int. Cl.  
*C23G 3/04* (2006.01)  
*B08B 5/04* (2006.01)  
(Continued)

(52) U.S. Cl.  
CPC .................. *C23G 3/04* (2013.01); *B08B 5/04* (2013.01); *B08B 9/043* (2013.01); *B08B 15/04* (2013.01);  
(Continued)

(58) Field of Classification Search  
CPC ....... B08B 15/04; B08B 2209/04; B08B 5/04; B08B 7/0042; B08B 7/04; B08B 9/043; B08B 9/00; B08B 9/027; B08B 9/032; B08B 9/0321; B08B 9/0322; B08B 9/0323; B08B 9/0325; B08B 9/0326; B08B 9/0327; B08B 9/0328; B08B 9/04; B08B 9/0433; B08B 9/0436; B08B 9/045; B08B 9/047; B08B 9/049; B08B 9/0492; B08B 9/0495; B08B 9/0497; B08B 9/051; B08B 9/053;  
(Continued)

(56) References Cited

U.S. PATENT DOCUMENTS 11,518,926 B2 12/2022 Reyes et al.  
11,603,728 B1 3/2023 Al-Harbi et al.  
(Continued)

FOREIGN PATENT DOCUMENTS

CN 1224644 A 8/1999  
CN 103790553 A 5/2014  
(Continued)

OTHER PUBLICATIONS

CN106362992A machine translation (Year: 2017).*  
(Continued)

*Primary Examiner* — Douglas Lee  
(74) *Attorney, Agent, or Firm* — Vorys, Sater, Seymour and Pease, LLP

(57) ABSTRACT

A system includes a pipe for transporting one or more fluids, the pipe including a scale deposit formed on an inner circumferential surface thereof and defining a reduced diameter flow area within the pipe, and a hybrid descaling tool sized to be received within the pipe. The hybrid descaling tool includes a laser head comprising a hollow cylindrical body with an internal, ring-shaped laser path, the laser head operable to emit a ring-shaped laser beam through the ring-shaped laser path, and an acid nozzle protruding forward from the hollow cylindrical body of the laser head and into the reduced diameter flow area, the acid nozzle including one or more acid outlets within the reduced diameter flow area.

20 Claims, 5 Drawing Sheets

(51) Int. Cl.
*B08B 9/043* (2006.01)
*B08B 15/04* (2006.01)
*B23K 26/073* (2006.01)
*B23K 26/146* (2014.01)
*B23K 26/354* (2014.01)

(52) U.S. Cl.
CPC ........ *B23K 26/0734* (2013.01); *B23K 26/146* (2015.10); *B23K 26/354* (2015.10); *B08B 2209/04* (2013.01)

(58) Field of Classification Search
CPC ..... B08B 9/0535; B08B 9/055; B08B 9/0551; B08B 9/0552; B08B 9/0553; B08B 9/0554; B08B 9/0555; B08B 9/0556; B08B 9/0557; B08B 9/0558; B08B 9/057; B23K 26/0734; B23K 26/146; B23K 26/354; C23G 3/04
See application file for complete search history.

(56) References Cited

U.S. PATENT DOCUMENTS

| | | | |
|---|---|---|---|
| 11,761,680 B2 | 9/2023 | Ferreira Da Silva et al. | |
| 2009/0205675 A1 | 8/2009 | Sarkar et al. | |
| 2013/0008659 A1 | 1/2013 | Schultz et al. | |
| 2013/0319984 A1 | 12/2013 | Linyaev et al. | |
| 2014/0090846 A1 | 4/2014 | Deutch et al. | |
| 2015/0165497 A1* | 6/2015 | Bozso ....................... | B08B 9/04 134/105 |
| 2016/0251940 A1 | 9/2016 | De Witt et al. | |
| 2018/0085858 A1 | 3/2018 | Toyosawa et al. | |
| 2021/0172256 A1* | 6/2021 | Noui-Mehidi .......... | E21B 47/04 |
| 2021/0404280 A1 | 12/2021 | Al Obaid | |
| 2023/0241653 A1 | 8/2023 | Batarseh et al. | |

FOREIGN PATENT DOCUMENTS

| | | | | |
|---|---|---|---|---|
| CN | 106362992 A * | 2/2017 | ............... | G21F 9/00 |
| CN | 206662539 U | 11/2017 | | |
| GB | 2520229 A | 5/2015 | | |
| WO | 2020102870 A1 | 5/2020 | | |
| WO | 2023195875 A1 | 10/2023 | | |

OTHER PUBLICATIONS

PCT International Search Report & Written Opinion pertaining to International Application No. PCT/US2025/020822; Date of Mailing: Jul. 17, 2025.

Batarseh, Sameeh, et al., "First Industrial Flowlines Descaling Field Deployment Utilizing High Power Laser Technology." Paper presented at the SPE Annual Technical Conference and Exhibition, Houston, Texas, USA, Oct. 2022.

San Roman Alerigi, Damian Pablo, et al., "Principles and Advantages of High-Power Lasers for Descaling Surface Equipment." Paper presented at the SPE Annual Technical Conference and Exhibition, Houston, Texas, USA, Oct. 2022.

* cited by examiner

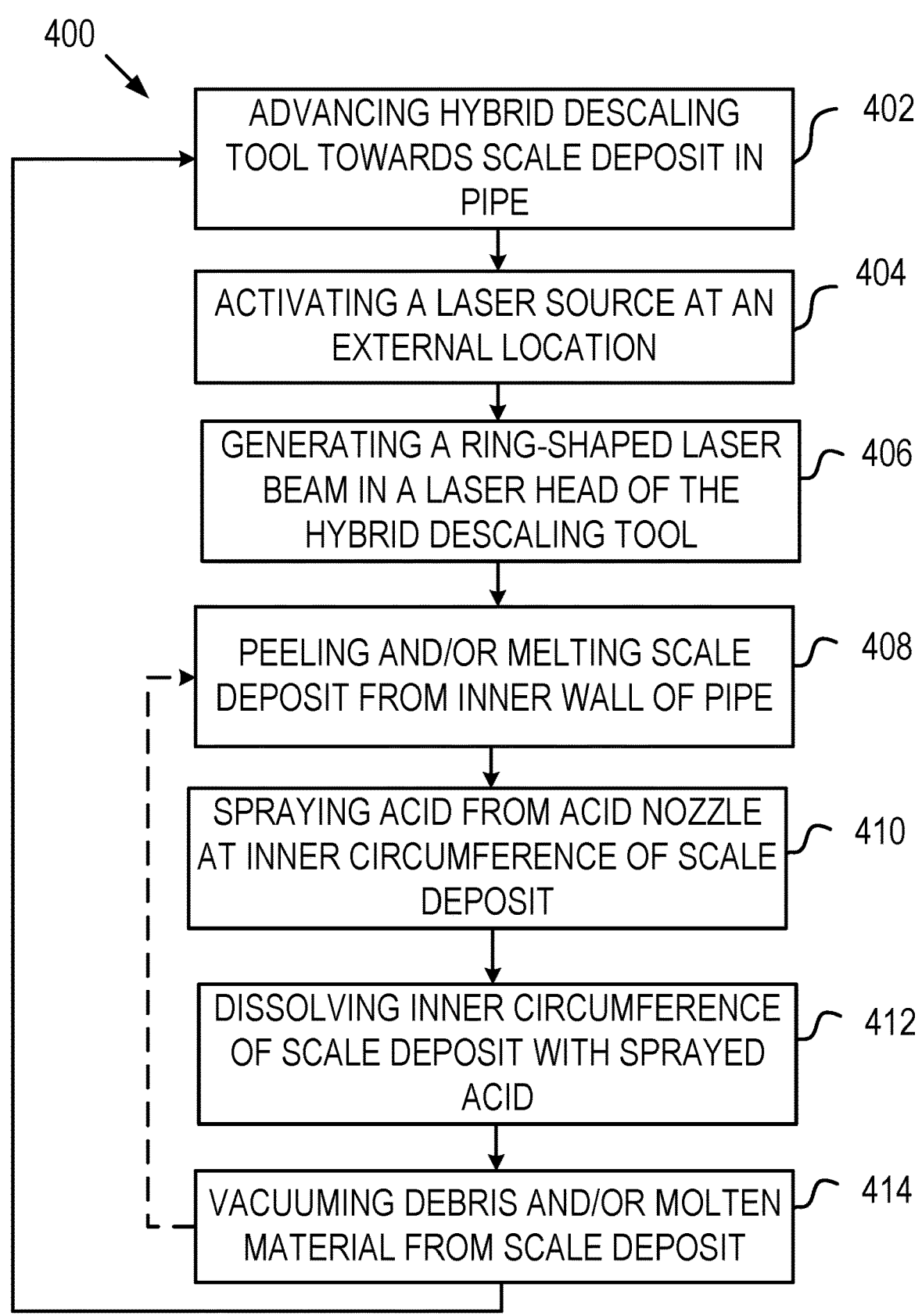

400

ADVANCING HYBRID DESCALING TOOL TOWARDS SCALE DEPOSIT IN PIPE — 402

ACTIVATING A LASER SOURCE AT AN EXTERNAL LOCATION — 404

GENERATING A RING-SHAPED LASER BEAM IN A LASER HEAD OF THE HYBRID DESCALING TOOL — 406

PEELING AND/OR MELTING SCALE DEPOSIT FROM INNER WALL OF PIPE — 408

SPRAYING ACID FROM ACID NOZZLE AT INNER CIRCUMFERENCE OF SCALE DEPOSIT — 410

DISSOLVING INNER CIRCUMFERENCE OF SCALE DEPOSIT WITH SPRAYED ACID — 412

VACUUMING DEBRIS AND/OR MOLTEN MATERIAL FROM SCALE DEPOSIT — 414

FIG.4

HYBRID DESCALING SYSTEM WITH ACID INJECTION

FIELD OF THE DISCLOSURE

The present disclosure relates generally to descaling tools and methods for use in pipes and, more particularly, to acid injection for enhanced scale removal while maintaining the integrity of the pipes.

BACKGROUND OF THE DISCLOSURE

Oil and gas operations extensively utilize piping circuits formed of pipes and flow control components for fluid transport, e.g., for transporting fluids into and out of wells. Scale buildup within these pipes is a common issue, particularly when water producing wells are involved. As water travels through the pipes, minerals dissolved in the water may be deposited as scale against the inner surfaces of the pipes and flow control components. Various scale types may be deposited including calcite, halite, barite, anhydrite, gypsum, and iron sulfide depending on the volume, salinity, temperature, and pressure of the water. Scale buildup may reduce the effective diameter of the pipes and may lead to restricted flowrates therethrough. Initial layers of scale deposition may corrosively damage the pipe and may lead to an acceleration of further scale buildup as well.

Both chemical and mechanical techniques have been developed for prevention or removal of scale deposits within piping circuits. Chemical scale removal techniques may utilize acids to eat away at the accumulated scale deposits, while mechanical scale removal may employ abrasive elements for dislodging scale from the interior surfaces of the pipes. However, the acids and abrasives may not act solely on the scale deposits, but may adversely affect the materials of which the pipes are constructed. For example, the acids and abrasives may generate pores within the metals, ceramics, elastomers and other materials forming the interior surfaces of the pipes, and may therefore, damage or weaken the pipes, leading to contamination, leakage, and downtime to allow for repairs or replacements.

Accordingly, a non-damaging scale removal tool is desirable for removing scale deposits in pipes without negatively affecting pipe integrity.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system includes a pipe for transporting one or more fluids, the pipe including a scale deposit formed on an inner circumferential surface thereof and defining a reduced diameter flow area within the pipe, and a hybrid descaling tool sized to be received within the pipe, the hybrid descaling tool including a laser head comprising a hollow cylindrical body with an internal, ring-shaped laser path, the laser head operable to emit a ring-shaped laser beam through the ring-shaped laser path, and an acid nozzle protruding forward from the hollow cylindrical body of the laser head and into the reduced diameter flow area, the acid nozzle including one or more acid outlets within the reduced diameter flow area.

In another embodiment, a method for descaling a pipe includes advancing a hybrid descaling tool towards a scale deposit defining a reduced diameter flow area in the pipe to position an acid nozzle of the hybrid descaling tool within the reduced diameter flow area, generating a ring-shaped laser beam in a hollow cylindrical laser head of the hybrid descaling tool and aimed towards the scale deposit, melting the scale deposit at or near an inner circumferential wall of the pipe via the ring-shaped laser beam, spraying an acid from the acid nozzle of the hybrid descaling tool towards an interior circumferential surface of the reduced diameter flow area, and dissolving the interior circumferential surface of the reduced diameter flow area defined by the scale deposit with the acid.

In a further embodiment, a hybrid descaling tool includes a laser head including a hollow cylindrical body and a laser path for receiving a ring-shaped laser beam, a nozzle body extending forward and through a center of the hollow cylindrical body of the laser head, the nozzle body including an acid nozzle at a forward end thereof, the acid nozzle including one or more acid outlets, a vacuum radially interposing the hollow cylindrical body and the nozzle body and operable to extract debris through an evacuation flow-path within the hollow cylindrical body, and one or more purging nozzles at or near the laser path of the laser head and expelling a purging fluid forward of the laser path of the laser head.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 4 is a flowchart for an example method for descaling a pipe via a hybrid descaling tool, according to at least one embodiment of the present disclosure.

DETAILED DESCRIPTION

Figure 1:
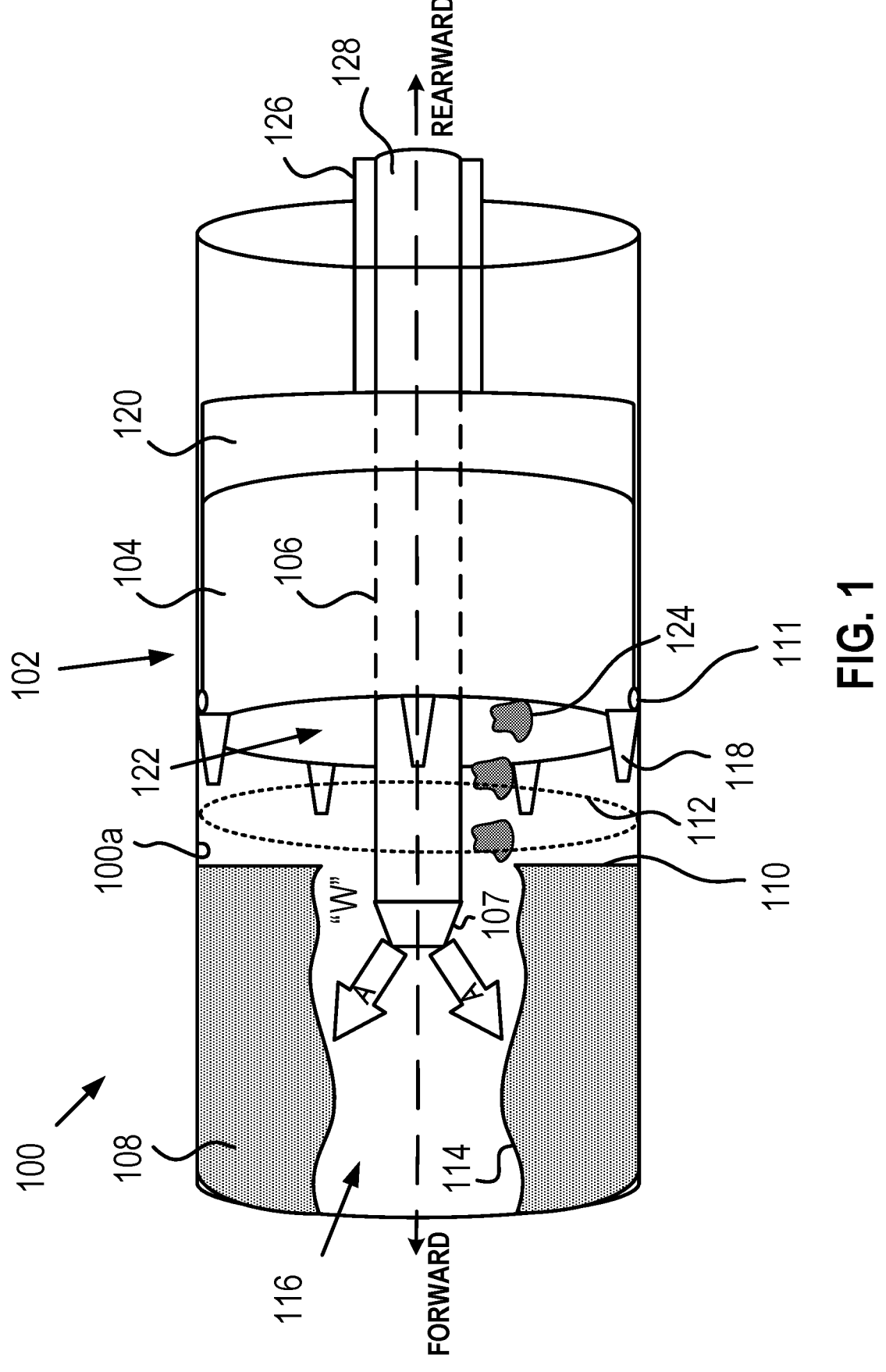
FIG. 1 is a schematic side view of a pipe with a hybrid descaling tool inserted therein, according to at least one embodiment of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to descaling tools for insertion in pipes and, more particularly, to hybrid descaling tools with laser treatment and acid injection capabilities for enhanced scale removal. The methods, systems, and apparatus disclosed herein utilize a laser head capable of producing a ring-shaped laser beam for melting, peeling, and dissolving of deposited scale on an inner circumference of a pipe. The ring-shaped laser beam may separate the deposited scale from the interior wall of the pipe without damaging the pipe material. In series or in parallel, one or more acid nozzles may be employed to spray an acid against the deposited scale. The acid may be sprayed over the entire scale deposit or only on a selected portion (such as an interior circumferential surface) of the deposited scale where it has been determined the acid will facilitate scale removal without damaging the pipe. From the dual-action of the ring-shaped laser beam and the sprayed acid, the deposited scale may be removed from the walls of the pipe and broken down.

The embodiments disclosed herein may further include a vacuum within the hybrid descaling tool and operable to facilitate extraction of any debris, molten material, and spent resources (acids, purging fluids, etc.) away from a working area within the pipe. The vacuum may enable maintenance of a clean environment within the pipe and may limit interruptions to the operation of the ring-shaped laser beam and sprayed acid. To aid in clearing and/or preparing the working area, one or more purging nozzles may be utilized for spraying a purging fluid in the path of the ring-shaped laser beam. The purging fluid may prevent debris from entering the path of the ring-shaped laser beam and from entering the laser head itself. Using the methods, systems, and apparatus disclosed herein, descaling operations may be rapidly performed within pipes without damaging the pipe material and while maintaining a clean environment therein.

FIG. 1 is a schematic side view of a pipe 100 with an example hybrid descaling tool 102 inserted (arranged) therein, according to at least one embodiment of the present disclosure. The hybrid descaling tool 102 (hereinafter, "the tool 102") includes a laser head 104 and nozzle body 106 for combined use in removal of a scale deposit 108 forward of the tool 102 within the pipe 100. A boundary 110 may be defined between the scale deposit 108 and a bare surface 100a of the pipe 100 within a working area "W" of the pipe 100. The bare surface 100a may have been previously cleaned with the tool 102. The laser head 104 may be sized to match an inner diameter of the pipe 100, and may generate or output a ring-shaped laser beam 112 into the pipe 100. The ring-shaped laser beam 112 may penetrate and melt the scale deposit 108 at an interface with the inner circumference of the pipe 100. The laser head 104 may accordingly melt the scale deposit 108 away from the pipe 100 without damaging or degrading the pipe 100.

In some embodiments, the laser head 104 may be sealingly engaged with the pipe 100 behind the working area "W", such that a seal 111 prevents any leakage of acid or molten material around an outer circumference of the laser head 104. In some embodiments, the seal 111 may be a rubberized component disposed on the outer circumference of the laser head 104 and compressible to form a seal within the pipe 100.

While the laser head 104 separates the scale deposit 108 from the inner circumference of the pipe 100, the nozzle body 106, and an acid nozzle 107 disposed thereon, may be used to spray one or more acids or caustic fluids onto the scale deposit 108. The nozzle body 106 may extend through and forward of the laser head 104, with the acid nozzle 107 disposed on a forward end of the nozzle body 106. The acid nozzle 107 may discharge an acid chosen for the specific scale deposit 108 present within the pipe 100, such that targeted removal of the scale deposit 108 may be performed. In some embodiments, the acid utilized may include, but is not limited to, hydrochloric acids, acetic acids, phosphoric acids, and any combination thereof.

The acid nozzle 107 may be used to target the scale deposit 108, such that an interior circumferential surface 114 of the scale deposit 108 may be degraded and removed by the acid while the laser head 104 separates the scale deposit 108 from the inner circumference of the pipe 100 at the boundary 110. The acid nozzle 107 may be arranged to target only the interior circumferential surface 114 of the scale deposit 108, such that no caustic fluid contacts the inner circumference of the pipe 100. In some embodiments, the scale deposit 108 may define a reduced diameter flow area 116 within the pipe. In these embodiments, the tool 102 may be advanced until the acid nozzle 107 is disposed within the reduced diameter flow area 116. As such, the pipe 100 may be protected from degradation or damage from the acid nozzle 107 while the laser head 104 harmlessly separates the scale deposit 108 therefrom. Accordingly, the tool 102 may enable separation and dissolution of the scale deposit 108 from the pipe 100 without acid interaction with the bare surface 100a and the metal of which the pipe 100 is constructed.

The tool 102 may further include a plurality of purging nozzles 118 positioned radially (circumferentially spaced) about the laser head 104. The purging nozzles 118 may be positioned at or near a forward end of the laser head 104, such that the purging nozzles 118 may protect a path of the laser beam 112. To do so, the purging nozzles 118 may expel a purging fluid, such as a nitrogen gas, at the output of the laser head 104 and the surrounding area. Further purging fluids may include water, any inert gas, or any optically transparent fluid which enables the laser beam 112 to pass through without absorption. The purging nozzles 118 may remove blockages or debris from the path of the ring-shaped laser beam 112, such that the laser head 104 may target the scale deposit 108 unimpeded. Further, the purging nozzles 118 may prevent debris from entering into the laser head 104 and affecting any sensitive components therein.

The tool 102 may further include a vacuum 120 extending rearwardly from the laser head 104 and otherwise operatively coupled to the back end of the laser head 104. In some embodiments, the vacuum 120 may be nestled (nested) within an evacuation flowpath 122 within the laser head 104. The vacuum 120 may be operable to pull (draw) ejected debris 124 from the scale deposit 108 as it is removed by the laser head 104 and acid nozzle 107. The debris 124 resulting from the descaling operations within the pipe 100 may be drawn into the evacuation flowpath 122 of the laser head 104 and towards the vacuum 120. The vacuum 120 may expel any debris 124 from a rear of the tool 102, or in some embodiments, the vacuum 120 may be in communication with a waste line 126 operable to transport extracted debris away from the pipe 100. As such, the vacuum 120 may prevent buildup of debris within the pipe 100 during descaling operations, and may transport away the removed scale deposit 108.

The tool 102 may be inserted into the pipe 100 on a tool arm 128, which may include a plurality of fiber optic cables, fluid lines, and other internal components. The tool arm 128 may be operably coupled to the tool 102 at or near the vacuum 120. The tool arm 128 may be coupled to the tool 102 at the nozzle body 106 which may run until termination at the acid nozzle 107. The tool arm 128 may enable an operator to advance the tool 102 within the pipe 100 while further enabling communication with one or more external locations (e.g., external location 302 of FIG. 3) during descaling operations. The tool arm 128 may be of a sufficient length to permit the tool 102 to be continuously inserted through the pipe 100 to target the scale deposit 108 at any point on the interior of the pipe.

Figure 2A:
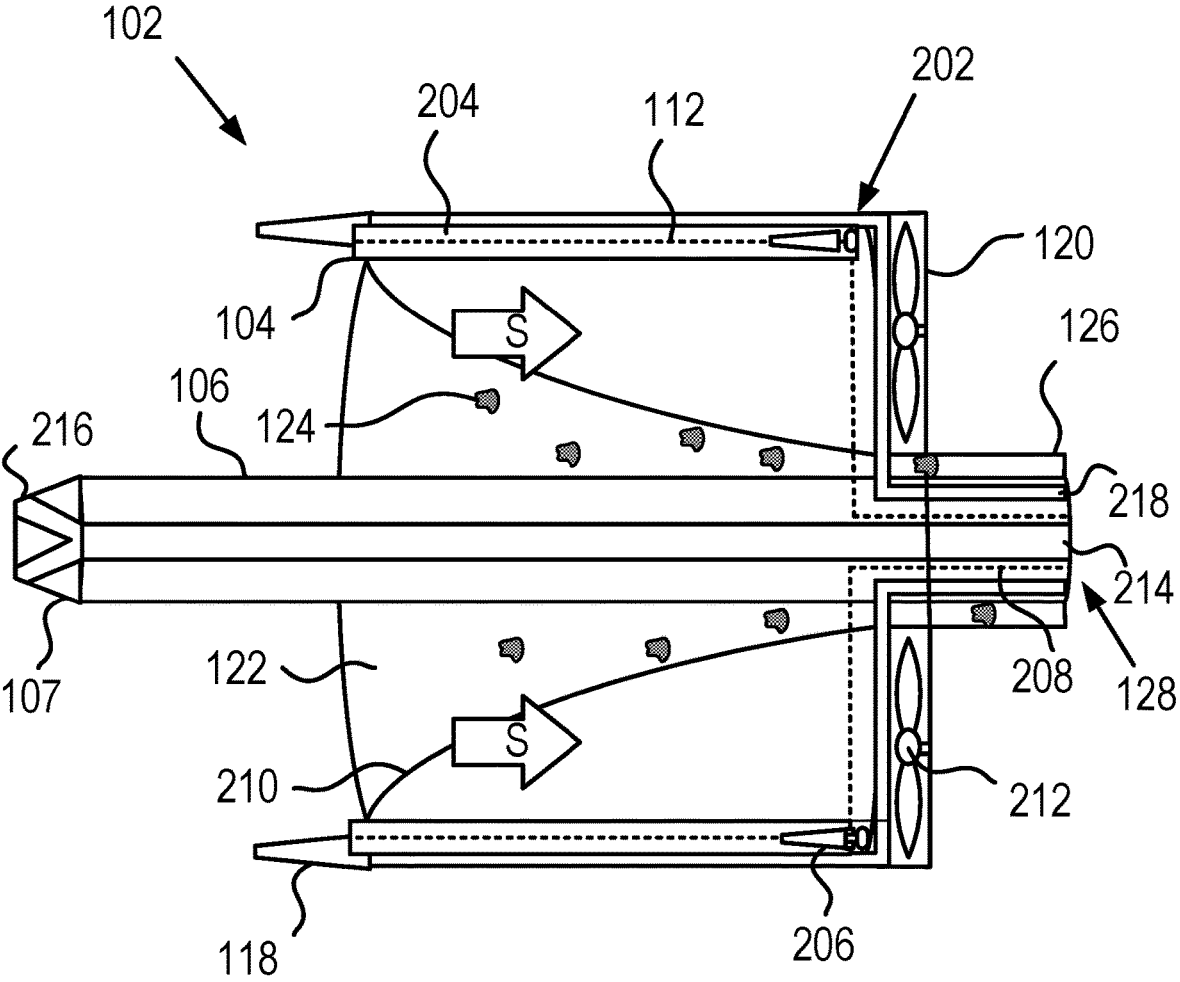
FIG. 2A is a cross-sectional side view of the descaling tool illustrating a laser head and vacuum, according to at least one embodiment of the present disclosure.

FIG. 2A is an enlarged cross-sectional side view of the tool 102 showing an internal view of the laser head 104 and vacuum 120, according to at least one embodiment of the present disclosure. As described above, the vacuum 120 may be nestled (arranged) within the evacuation flowpath 122 of the laser head 104 to receive any debris generated during the descaling operation. As such, the illustrated embodiment depicts a hollow cylindrical body 202 of the laser head 104 with the vacuum 120 inserted therein and protruding rearwardly therefrom.

The hollow cylindrical body 202 includes a laser path 204 therein, which may be cylindrical to accommodate the ring-shaped laser beam 112 within the laser head 104. In some embodiments, the laser path 204 may include an optical component 206 within a rearward portion of the laser path 204. In some embodiments, the optical component 206 may be a diffractive optical component to diffract laser energy into the ring-shaped laser beam 112. In further embodiments, the optical component 206 may be a rotatably mounted optical component operable to rotate at high-speeds to generate the ring-shaped laser beam 112. A fiber optic cable 208 may transport laser energy to the laser head 104 for use in descaling operations. The fiber optic cable 208 may be included within the tool arm 128, such that the fiber optic cable 208 may be protected during motion of the tool 102.

Figure 2B:
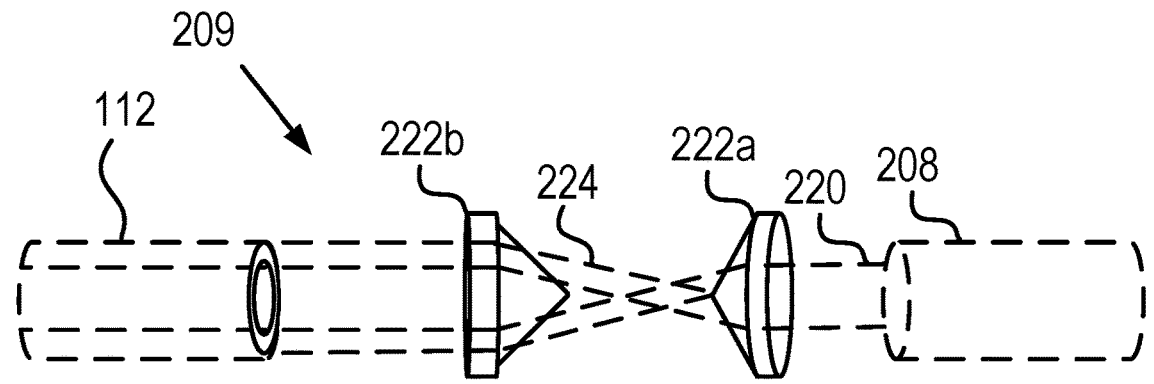
FIG. 2B is a schematic side view of an example optical assembly for generating a ring-shaped laser beam in the laser head according to aspects of the present disclosure.

Referring briefly to FIG. 2B, a schematic side view of an example optical assembly 209 for converting a cylindrical laser beam 220 into the ring-shaped laser beam 112 is illustrated. The fiber optic cable 208 may emit the cylindrical laser beam 220 towards a first conical lens 222a of the optical assembly 209. The first conical lens 222a may receive the cylindrical laser beam 220 and emit a diverging ring-shaped beam 224 towards a second conical lens 222b. The second conical lens 222b may receive the diverging ring-shaped beam 224 and collimate the diverging ring-shaped beam 224 into the ring-shaped laser beam 112 for output from the laser head 104. Based upon an internal angle and aspect ratio of the conical lenses 222a-b, the width and eccentricity of the ring-shaped laser beam 112 may be modified and controlled.

Those skilled in the art will readily appreciate that FIG. 2B represents an example optical assembly 209, and that further methods of generating the ring-shaped laser beam 112 may be employed without departing from the scope of this disclosure.

Returning to FIG. 2A, in the illustrated embodiment, the vacuum 120 may include funnel body 210 interposing the hollow cylindrical body 202 and the nozzle body 106 within the evacuation flowpath 122. The funnel body 210 may guide debris 124 through the evacuation flowpath 122 and towards the waste line 126. The vacuum 120 may further include one or more impellers 212 to provide suction "S" within the evacuation flowpath 122. The suction "S" provided by the impellers 212 may aid in guiding the debris 124 into the evacuation flowpath 122 and along the funnel body 210. The vacuum 120 may thus extract the debris 124 from the scale deposit 108 of FIG. 1 through the evacuation flowpath 122 between the hollow cylindrical body 202 of the laser head 104 and the nozzle body 106. As debris is ejected from the scale deposit 108, the vacuum 120 may accordingly aid in protection of the nozzle body 106, acid nozzle 107, and laser head 104 from impacts or blockages from debris 124 during descaling operations.

As discussed above, the vacuum 120 may be in communication with the waste line 126 for removal of the extracted debris 124. As shown in the illustrated embodiment, the waste line 126 may be disposed against an external circumference of the tool arm 128 on a rearward side of the vacuum 120 for transporting the debris 124 out of the pipe 100 (FIG. 1). In further embodiments, however, the waste line 126 may be included within the tool arm 128, such that the debris 124 is transported within the tool arm 128 to an external location (e.g., the external location 302 of FIG. 3).

The nozzle body 106 and tool arm 128 may include a primary flowpath 214 therein, which may enable the acid to reach the acid nozzle 107. In the illustrated embodiment, the primary flowpath 214 terminates at the acid nozzle 107, wherein a plurality of branching outlets 216 are provided for directional spraying of the acid. In the illustrated embodiment, fixed (branching) outlets 216 are directed in a radially outward and axially forward direction. In other embodiments, however, the acid nozzle 107 may include one or more aimable outlets (not shown) which may be electronically or mechanically controlled to spray acid at a desired angle or orientation.

The tool arm 128 may further include one or more secondary flowpaths 218 therein, which may transport purging fluid to the purging nozzles 118. The secondary flowpaths 218 may be in fluid communication with a purging fluid source (e.g., the purging fluid source 310 of FIG. 3) such that a purging fluid may be expelled from the purging nozzles 118.

Figure 2C:
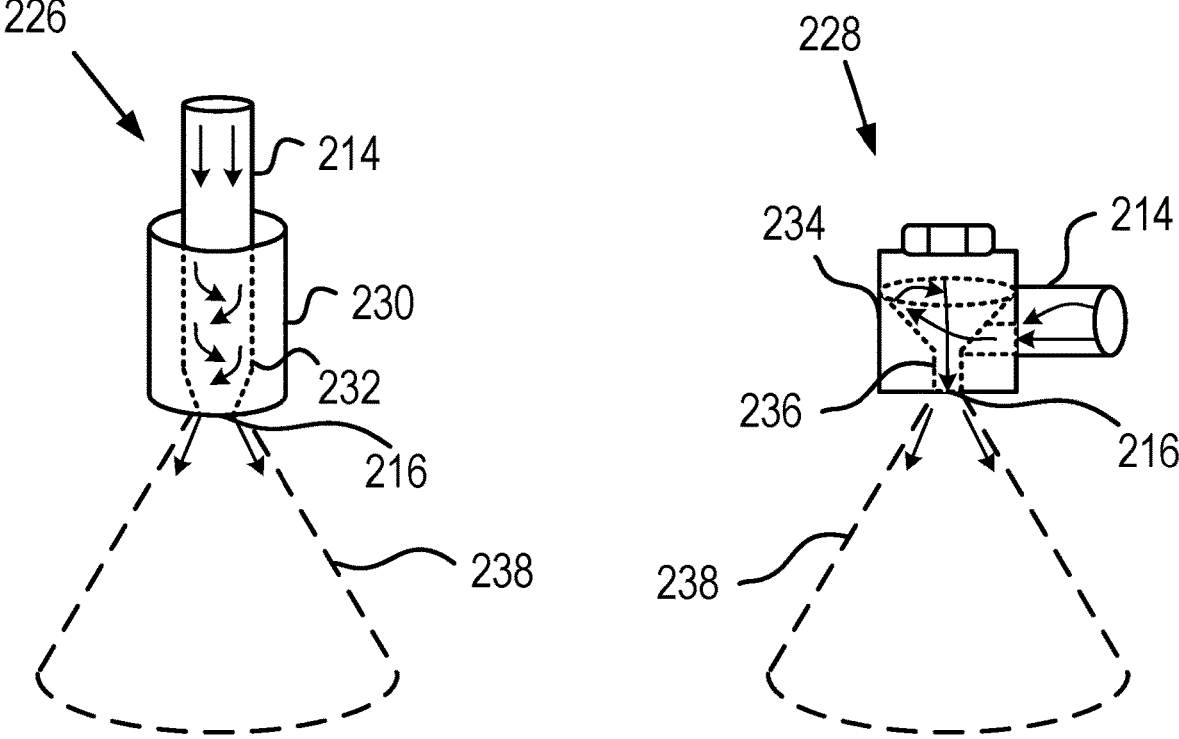
FIG. 2C is a schematic side view of two variations of an acid nozzle that may be carried by the descaling tool according to aspects of the present disclosure.

FIG. 2C depicts schematic side views of two variations of the acid nozzle 107, including an axial nozzle 226 and a tangential nozzle 228. Both the axial nozzle 226 and the tangential nozzle 228 may receive an acid via the primary flowpath 214. The acid may enter into the body 230 of the axial nozzle 226 and may enter a vortex chamber 232 provided within the body 230. The vortex chamber 232 may guide the flow of the acid into a spiraling motion towards an outlet 216 of the axial nozzle 226. In contrast, the acid may enter perpendicular to the body 234 of the tangential nozzle 228 and may flow into a funnel 236 provided within the body 234. The funnel 236 may guide the acid away from the outlet 216 and around the funnel 236 of the tangential nozzle 228 before spiraling the acid downward through the funnel 236 and towards the outlet 216. For both the axial nozzle 226 and the tangential nozzle 228, the acid may be emitted in a conical spray 238. The conical spray 238 may accordingly be aimed at the interior circumferential surface 114 of the scale deposit 108 to remove the interior scale matrix.

Figure 3:
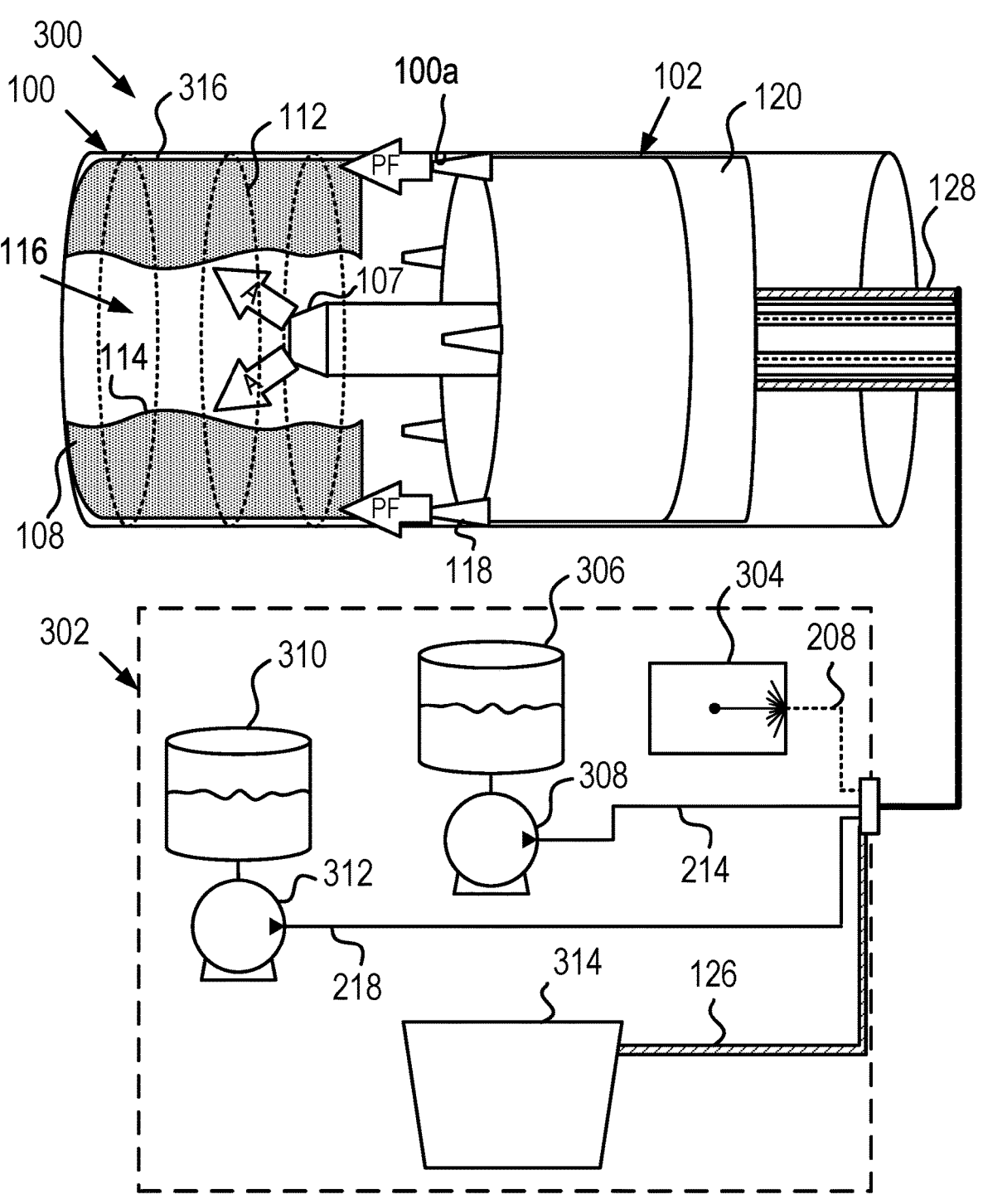
FIG. 3 is a schematic side view of a descaling system including the descaling tool deployed at least partially within the pipe, according to at least one embodiment of the present disclosure.

FIG. 3 is a schematic side view of a hybrid descaling system 300 with the tool 102 deployed at least partially within the pipe 100, according to at least one embodiment of the present disclosure. One or more components of the system 300 are included at an external location 302 remote from the pipe 100. The external location 302 may be in communication with the tool 102 via the tool arm 128. The external location 302 may include a laser source 304 therein, which may generate the laser energy employed by the laser head 104 for generating the ring-shaped laser beam 112. The laser source 304 may accordingly be in communication with the fiber optic cable 208 which may be transported to the pipe 100 within the tool arm 128. In high-powered laser applications, the size and weight of the laser source 304 may be prohibitive for manual transportation and deployment into the pipe 100. Accordingly, in some embodiments, the laser source 304 may be trailer- or truck-mounted to enable rapid deployment of the laser source 304 to the external location 302 as needed without departing from the scope of this disclosure.

The external location 302 may further include an acid source 306 which houses one or more acids "A" to be sprayed from the acid nozzle 107. The acid source 306 may be a pressurized, corrosion-resistant fluid container, such that the acid "A" may be safely transported and replenished at the external location 302. In the illustrated embodiment, the acid nozzle 107 and the acid source 306 are interposed by an acid pump 308. The acid pump 308 may receive the acid "A" from the acid source 306 and may provide (convey) the acid "A" at pressure to the primary flowpath 214. Accordingly, the acid "A" may be sprayed from the acid nozzle 107 towards the scale deposit 108, as illustrated.

Similarly, the external location 302 may further include a purging fluid source 310. The purging fluid source 310 may be a pressurized fluid tank capable of providing purging fluid "PF" to the tool 102. In some embodiments, the purging fluid source 310 and purging nozzles may be interposed by a purging pump 312. The purging pump 312 may receive purging fluid "PF" from the purging fluid source 310 and may provide the purging fluid "PF" at pressure to the secondary flowpath 218. Accordingly, the purging fluid "PF" may be expelled from the purging nozzles 118 to clear a path for the ring-shaped laser beam 112, as illustrated.

In some embodiments, the external location 302 may include a waste disposal unit 314 which may receive any extracted debris from the scale deposit 108. The waste disposal unit 314 may be in communication with the waste line 126, such that the debris 124 of FIGS. 1-2 collected by the vacuum 120 may be received within the waste disposal unit 314. The waste disposal unit 314 may be similarly truck- or trailer-mounted for rapid deployment and hauling away of the waste disposal unit 314.

During operation, the laser head 104 may output the ring-shaped laser beam 112 along the bare surface 100a on an inner circumference of the pipe 100. As the ring-shaped laser beam 112 penetrates the scale deposit 108, the scale deposit 108 may melt and peel from the bare surface 100a of the pipe 100 to create a clearance 316 separating the pipe 100 from the scale deposit 108. As the ring-shaped laser beam 112 ejects debris 124 and molten material from the scale deposit 108, the purging nozzles 118 may expel purging fluid "PF" to prevent blockage of the path of the ring-shaped laser beam 112. Simultaneously, the acid nozzle 107 may spray a chosen acid "A" against the interior circumferential surface 114 of the scale deposit 108 while avoiding spraying near to the bare surface 100a on the inner circumference of the pipe 100. Accordingly, the chosen acid "A" may degrade and dissolve the scale deposit 108 without affecting the structural integrity of the materials comprising the pipe 100.

The dual-action melting and dissolution of the scale deposit 108 performed by the tool 102 may enable optimal cleaning of the pipe 100 while minimizing or eliminating damage to the pipe 100. The vacuum 120 may constantly run to extract any debris, molten material, spent acid "A", and purging fluid "PF" and debris from the working area "W" forward or the laser head within the pipe 100. As such, contaminants and debris in the working area may be limited, and the pipe 100 may be maintained in a clean state.

FIG. 4 is a flowchart for an example method 400 for descaling a pipe via a hybrid descaling tool according to at least one embodiment of the present disclosure. The method 400 may be implemented by hybrid descaling tool 102 and hybrid descaling system 300 as shown in FIG. 1-3. Thus, reference can be made to the example of FIGS. 1-3 in the example of FIG. 4. The method 400 may begin at 402 with advancing a hybrid descaling tool (e.g., the hybrid descaling tool 102 of FIGS. 1-3) within a pipe (e.g., the pipe 100 of FIGS. 1 and 3) and towards a scale deposit (e.g., the scale deposit 108 of FIGS. 1 and 3) within the pipe. In some embodiments, a nozzle body (e.g., the nozzle body 106 of FIGS. 1-3) may extend forward of a boundary of the scale deposit (e.g., the boundary 110 of FIGS. 1 and 3) and into a reduced diameter flow area (e.g., the reduced diameter flow area 116 of FIGS. 1 and 3) through the scale deposit. A hybrid descaling tool may be chosen at, or prior to, 402 which includes a vacuum (e.g., the vacuum 120 of FIGS. 1-3) and a laser head (e.g., the laser head 104 of FIGS. 1-3) that are sized to fit closely within the inner diameter of the pipe. The hybrid descaling tool may be run into the pipe on a tool arm (e.g., the tool arm 128 of FIGS. 1-3) to connect the hybrid descaling tool to an external location (e.g., the external location 302 of FIG. 3). In other embodiments, the tool 102 may be pumped into position within a pipe 100 within a wellbore, pipeline or another piping circuit.

The method 400 may continue at 404 with activating a laser source (e.g., the laser source 304 of FIG. 3) at an external location. The tool arm may connect the hybrid descaling tool to an external location. The external location may include at a laser source with a fiber optic cable (e.g., fiber optic cable 208 of FIGS. 2-3) running from the laser source to the hybrid descaling tool within the tool arm. In some embodiments, the external location may further include a purging fluid source (e.g., the purging fluid source 310 of FIG. 3) and a purging pump (e.g., the purging pump 312 of FIG. 3). The method 400 may continue at 406 with generating a ring-shaped laser beam (e.g., the ring-shaped laser beam 112 of FIGS. 2-3) via the laser head of the hybrid descaling tool. The laser head may include a laser path (e.g., laser path 204 of FIG. 2A) wherein the ring-shaped laser beam may originate using energy from the laser source. The ring-shaped laser beam may be fired from the laser head towards the scale deposit along an inner circumference of the pipe.

The method 400 may continue at 408 with peeling and/or melting the scale deposit from the inner wall of the pipe with the ring-shaped laser beam. The high-powered ring-shaped laser beam emitted from the laser head may destabilize or melt the deposited scale along the walls of the pipe. Destabilizing or melting the deposited scale may result in chunks of scale or molten material to be peeled from the periphery of the scale deposit and away from the pipe walls as the laser head continues to fire. In some embodiments, the hybrid descaling tool may include one or more purging nozzles (e.g., the purging nozzles 118 of FIGS. 1-3). The purging nozzles may be in fluid communication with the purging fluid source at the external location, and may expel the purging fluid at or near the laser head. The expelled purging fluid may generate a barrier between the laser head and the scale deposit or molten material through which the high-powered ring-shaped laser beam may freely pass, while debris and molten material may be ejected from the area. The purging nozzles may be activated at 408 to protect the hybrid descaling tool in operation.

The method 400 may continue at 410 with spraying of an acid from an acid nozzle (e.g., acid nozzle 107 of FIGS. 1-3) of the hybrid descaling tool towards an interior circumferential surface (e.g., the interior circumferential surface 114 of FIGS. 1 and 3) of the scale deposit. The acid nozzle may be disposed on a forward end of the nozzle body centered within a hollow cylindrical body (e.g., the hollow cylindrical body 202 of FIG. 2A) of the laser head, and may further protrude forward therefrom. As such, the acid nozzle may extend some distance forward from the laser head to enable insertion into the reduced diameter flow area of the scale deposit. The acid nozzle may be aimed or adjusted to spray provided acid on the inner circumferential surface of the scale deposit, and the amount of acid sprayed may be limited such that the acid is absorbed by the scale deposit without accumulating on the bare surface of the pipe. Thus, the bare surface on the inner circumference of the pipe is not damaged by the acid. The acid may be provided by an acid source (e.g., the acid source 306 of FIG. 3) at an external location, and may be provided via an acid pump (e.g., the acid pump 308 of FIG. 3). The acid may be chosen based upon the composition of the scale deposit, such that optimal dissolution of the scale deposit may be performed. As such, the method 400 may continue at 412 with dissolving the interior section of the scale deposit via the sprayed acid. The dissolving of the scale deposit at 412 may remove and break apart the scale deposit as it is separated from the pipe via the ring-shaped laser beam. Accordingly, the separated scale deposit may be further fragmented and dissolved into smaller pieces for removal from the pipe. The combined action of the ring-shaped laser beam and the sprayed acid may ensure rapid removal of the scale deposit from the pipe without damage to the walls of the pipe.

The method 400 may continue at 414 with vacuuming of debris and/or molten material from the scale deposit. The vacuuming at 414 may be performed by the vacuum of the hybrid descaling tool, such that the vacuum may receive any debris and molten material produced at 408 and 412. The vacuum may include a funnel body (e.g., the funnel body 210 of FIG. 2A) interposing the hollow cylindrical body and the nozzle body within an evacuation flowpath (e.g., the evacuation flowpath 122 of FIGS. 1-3). The funnel body may guide debris (e.g., the debris 124 of FIGS. 1-2) through the evacuation flowpath and towards a waste line (e.g., the waste line 126 of FIGS. 1-3). The funnel body may be provided radially between the hollow cylindrical body of the laser head and the nozzle body extending therethrough. The vacuum may receive the debris, molten material, and any spent fluids from the working area to prevent obstruction of the ring-shaped laser beam or sprayed acid during operation. The vacuum may accordingly expel the debris and molten material out into the waste such that the debris and molten material are removed from the working area. In some embodiments, the vacuum and waste line may be connected to a waste disposal unit (e.g., waste disposal unit 314 of FIG. 3) for collection and eventual disposal of the removed debris.

While the method 400 is depicted as executing in serial, it will be appreciated that any of the peeling and/or melting of the scale deposit at 408, spraying acid at 410, dissolving of the interior of the scale deposit at 412, and/or vacuuming of the debris at 414 may be performed in parallel. In some embodiments, the peeling and/or melting of the scale deposit at 408, spraying acid at 410, dissolving of the interior circumferential surface of the scale deposit at 412, and vacuuming of the debris at 414 may be performed cyclically and/or simultaneously, such that the method may continue at 408 with further peeling or melting of the scale deposit from the walls of the pipe. The method 400 may terminate after complete removal of the scale deposit vacuuming away of the scale deposit at 414. In further embodiments, however, the method 400 may continue at 402 with advancing the hybrid descaling tool within the pipe. In these embodiments, the hybrid descaling tool may advance towards remaining portions of the scale deposit such that the acid nozzle is maintained forward of the boundary of the scale deposit. The method 400 may then continue through the pipe until a desired amount of descaling has been performed within the pipe. In this way, the hybrid descaling tool may enable rapid full descaling of a pipe without damaging of the pipe materials.

Embodiments disclosed herein include:

A. A system comprising a pipe for transporting one or more fluids, the pipe including a scale deposit formed on an inner circumferential surface thereof and defining a reduced diameter flow area within the pipe, and a hybrid descaling tool sized to be received within the pipe, the hybrid descaling tool including a laser head comprising a hollow cylindrical body with an internal, ring-shaped laser path, the laser head operable to emit a ring-shaped laser beam through the ring-shaped laser path, and an acid nozzle protruding forward from the hollow cylindrical body of the laser head and into the reduced diameter flow area, the acid nozzle including one or more acid outlets within the reduced diameter flow area.

B. A method for descaling a pipe, the method comprising advancing a hybrid descaling tool towards a scale deposit defining a reduced diameter flow area in the pipe to position an acid nozzle of the hybrid descaling tool within the reduced diameter flow area, generating a ring-shaped laser beam in a hollow cylindrical laser head of the hybrid descaling tool and aimed towards the scale deposit, melting the scale deposit at or near an inner circumferential wall of the pipe via the ring-shaped laser beam, spraying an acid from the acid nozzle of the hybrid descaling tool towards an interior circumferential surface of the reduced diameter flow area, and dissolving the interior circumferential surface of the reduced diameter flow area defined by the scale deposit with the acid.

C. A hybrid descaling tool comprising a laser head including a hollow cylindrical body and a laser path for receiving a ring-shaped laser beam, a nozzle body extending forward and through a center of the hollow cylindrical body of the laser head, the nozzle body including an acid nozzle at a forward end thereof, the acid nozzle including one or more acid outlets, a vacuum radially interposing the hollow cylindrical body and the nozzle body and operable to extract debris through an evacuation flowpath within the hollow cylindrical body, and one or more purging nozzles at or near the laser path of the laser head and expelling a purging fluid forward of the laser path of the laser head.

Each of embodiments A through C may have one or more of the following additional elements in any combination: Element 1: wherein the hybrid descaling tool further includes a nozzle body extending through and forward of the laser head and including the acid nozzle thereon. Element 2: wherein the hybrid descaling tool further comprises a vacuum interposing the hollow cylindrical body of the laser head and the nozzle body. Element 3: wherein the vacuum includes a funnel body shaped to guide debris through an evacuation flowpath within the hollow cylindrical body of the laser head. Element 4: further comprising a waste line in communication with the vacuum and sized to transport debris and/or molten material away from the pipe. Element 5: further comprising a waste disposal unit at an external location and in communication with the waste line, wherein the waste disposal unit receives debris, molten material, acid, or any combination thereof from the pipe. Element 6: further comprising a laser source stored at an external location and mated to a fiber optic cable, wherein the fiber optic cable is in optical communication with the laser head and provides laser energy from the laser source to the laser head for the ring-shaped laser beam. Element 7: further comprising: an acid source storing a chosen acid and mated to a primary flowpath, wherein the primary flowpath terminates at the acid nozzle; and an acid pump interposing the acid source and the acid nozzle and providing the chosen acid at a specified pressure to the acid nozzle.

Element 8: wherein the hybrid descaling tool further includes one or more purging nozzles at or near the laser head and mated to a secondary flowpath. Element 9: wherein the secondary flowpath is in fluid communication with a purging fluid source storing a purging fluid. Element 10: further comprising a purging pump interposing the purging fluid source and purging nozzles and providing the purging fluid at a specified pressure to the purging nozzles. Element 11: further comprising: activating a laser source to provide a high-powered laser beam to the hollow cylindrical laser head. Element 12: further comprising: vacuuming debris and/or molten material from the inner circumferential wall of the pipe and the interior circumferential surface of the reduced diameter flow area via a vacuum of the hybrid descaling tool.

Element 13: further comprising transporting the debris and/or molten material through a waste line to a waste disposal unit. Element 14, further comprising: advancing the hybrid descaling tool towards a further scale deposit, a deeper portion of the scale deposit, or a combination thereof. Element 15: further comprising a seal at or near a forward end of the hollow cylindrical body of the laser head. Element 16: wherein the vacuum comprises a funnel body shaped to guide debris through the evacuation flowpath and towards a waste line. Element 17: wherein the vacuum further comprises one or more impellers operable to generate suction within the evacuation flowpath.

By way of non-limiting example, exemplary combinations applicable to A through C include: Element 1 with Element 2; Element 2 with Element 3; Element 3 with Element 4; Element 4 with Element 5; Element 8 with Element 9; Element 9 with Element 10; Element 12 with Element 13; and Element 16 with Element 17.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:
a pipe for transporting one or more fluids, the pipe including a scale deposit formed on an inner circumferential surface thereof and defining a reduced diameter flow area within the pipe; and
a hybrid descaling tool sized to be received within the pipe, the hybrid descaling tool including:
a laser head comprising a hollow cylindrical body with an internal, ring-shaped laser path, the laser head operable to emit a ring-shaped laser beam in a direction axially forward of the hollow cylindrical body and through the ring-shaped laser path; and
an acid nozzle protruding forward from the hollow cylindrical body of the laser head and into the reduced diameter flow area, the acid nozzle including one or more acid outlets positionable within the reduced diameter flow area.

2. The system of claim 1, wherein the hybrid descaling tool further includes a nozzle body extending through and forward of the laser head and including the acid nozzle thereon.

3. The system of claim 2, wherein the hybrid descaling tool further comprises a vacuum interposing the hollow cylindrical body of the laser head and the nozzle body.

4. The system of claim 3, wherein the vacuum includes a funnel body shaped to guide debris through an evacuation flowpath within the hollow cylindrical body of the laser head.

5. The system of claim 4, further comprising a waste line in communication with the vacuum and sized to transport debris and/or molten material away from the pipe.

6. The system of claim 5, further comprising a waste disposal unit at an external location and in communication with the waste line, wherein the waste disposal unit receives debris, molten material, acid, or any combination thereof from the pipe.

7. The system of claim 1, further comprising a laser source stored at an external location and mated to a fiber optic cable, wherein the fiber optic cable is in optical communication with the laser head and provides laser energy from the laser source to the laser head for the ring-shaped laser beam.

8. The system of claim 1, further comprising:

an acid source storing a chosen acid and in fluid communication with a primary flowpath, wherein the primary flowpath terminates at the acid nozzle; and an acid pump interposing the acid source and the acid nozzle and operable to provide the chosen acid at a specified pressure to the acid nozzle.

9. The system of claim 1, wherein the hybrid descaling tool further includes one or more purging nozzles at or near the laser head and mated to a secondary flowpath.

10. The system of claim 9, wherein the secondary flowpath is in fluid communication with a purging fluid source storing a purging fluid.

11. The system of claim 10, further comprising a purging pump interposing the purging fluid source and purging nozzles and providing the purging fluid at a specified pressure to the purging nozzles.

12. A method for descaling a pipe, comprising:

advancing a hybrid descaling tool towards a scale deposit formed within the pipe and defining a reduced diameter flow area, and thereby positioning an acid nozzle of the hybrid descaling tool within the reduced diameter flow area;

generating a ring-shaped laser beam in a hollow cylindrical laser head of the hybrid descaling tool and aimed in a direction axially forward of the hollow cylindrical laser head and towards the scale deposit;

melting the scale deposit at or near an inner circumferential wall of the pipe via the ring-shaped laser beam;

spraying an acid from the acid nozzle of the hybrid descaling tool towards an interior circumferential surface of the reduced diameter flow area; and dissolving the interior circumferential surface of the reduced diameter flow area defined by the scale deposit with the acid.

13. The method of claim 12, further comprising activating a laser source to provide a high-powered laser beam to the hollow cylindrical laser head.

14. The method of claim 12, further comprising vacuuming debris and/or molten material from the inner circumferential wall of the pipe and the interior circumferential surface of the reduced diameter flow area via a vacuum of the hybrid descaling tool.

15. The method of claim 14, further comprising transporting the debris and/or molten material through a waste line to a waste disposal unit.

16. The method of claim 12, further comprising advancing the hybrid descaling tool towards a further scale deposit, a deeper portion of the scale deposit, or a combination thereof.

17. A hybrid descaling tool, comprising:

a laser head including a hollow cylindrical body and a laser path for receiving a ring-shaped laser beam;

a nozzle body extending forward and through a center of the hollow cylindrical body of the laser head, the nozzle body including an acid nozzle at a forward end thereof, the acid nozzle including one or more acid outlets;

a vacuum radially interposing the hollow cylindrical body and the nozzle body and operable to extract debris through an evacuation flowpath within the hollow cylindrical body; and one or more purging nozzles at or near the laser path of the laser head and expelling a purging fluid forward of the laser path of the laser head.

18. The hybrid descaling tool of claim 17, further comprising a seal at or near a forward end of the hollow cylindrical body of the laser head.

19. The hybrid descaling tool of claim 17, wherein the vacuum comprises a funnel body shaped to guide debris through the evacuation flowpath and towards a waste line.

20. The hybrid descaling tool of claim 19, wherein the vacuum further comprises one or more impellers operable to generate suction within the evacuation flowpath.

* * * * *